United States Patent
Von Gemmingen

(10) Patent No.: US 6,203,596 B1
(45) Date of Patent: Mar. 20, 2001

(54) PROCESS AND APPARATUS FOR REMOVING HYDROGEN AND/OR CARBON MONOXIDE FROM AN AIR STREAM

(75) Inventor: Ulrich Von Gemmingen, Munich (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 09/165,640

(22) Filed: Oct. 2, 1998

(30) Foreign Application Priority Data

Oct. 2, 1997 (DE) .............................................. 197 43 733

(51) Int. Cl.$^7$ .............................. B03C 3/011; B03C 3/019
(52) U.S. Cl. .................................... 95/42; 62/640; 62/642; 95/69; 95/70; 96/55; 96/57; 422/122; 422/217; 423/215.5
(58) Field of Search ........................ 95/70, 69, 223–225, 95/39–42; 96/55, 57, 58; 423/215.5; 422/122, 217; 62/640, 642

(56) References Cited

U.S. PATENT DOCUMENTS

| 4,537,748 | 8/1985 | Billiet ................................. 422/122 |
| 5,030,428 | 7/1991 | Dörr et al. ........................ 423/215.5 |
| 5,649,985 | 7/1997 | Imamura ............................. 95/225 X |

FOREIGN PATENT DOCUMENTS

| 0 416 140 | 3/1991 | (EP) . |
| 0 716 274 | 6/1996 | (EP) . |

OTHER PUBLICATIONS

O.C. Leite, "Cleaning up Incineration Exhaust", *Environmental Engineering World*, pp. 6–11, Jul.–Aug. 1996.*

* cited by examiner

Primary Examiner—Richard L. Chiesa
(74) Attorney, Agent, or Firm—Millen, White, Zelano & Branigan, P.C.

(57) ABSTRACT

The process serves for removing carbon monoxide and/or hydrogen from an air stream by catalytic oxidation. Dusts and/or aerosols of a particle size of less than 20 μm are removed from the air stream upstream of the catalytic oxidation.

17 Claims, 1 Drawing Sheet

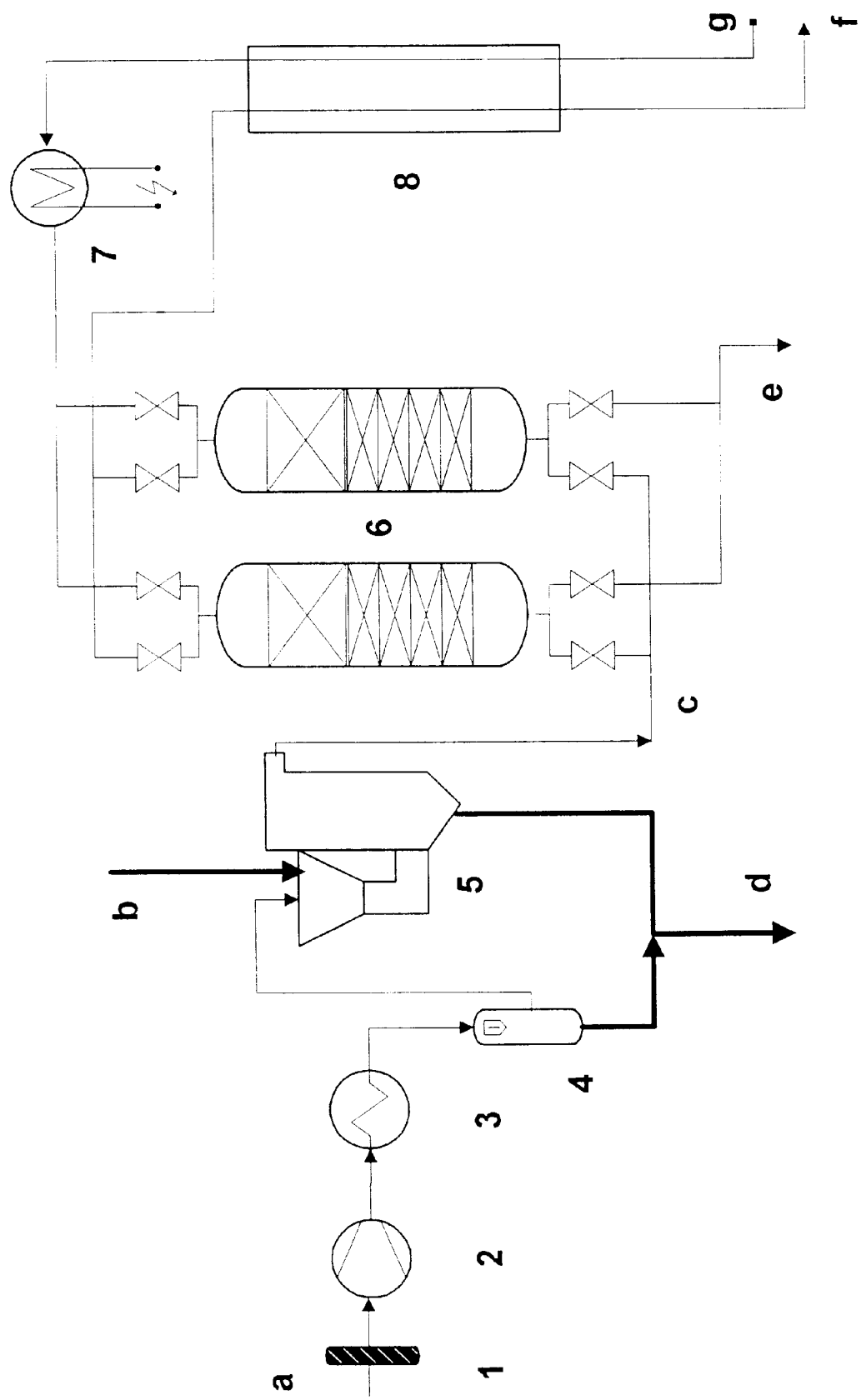

PROCESS AND APPARATUS FOR REMOVING HYDROGEN AND/OR CARBON MONOXIDE FROM AN AIR STREAM

FIELD OF THE INVENTION

The invention relates to a process for removing carbon monoxide and/or hydrogen from an air stream in which the air stream is subjected to a catalytic oxidation.

BACKGROUND OF THE INVENTION

To produce semiconductor elements, ultra high purity nitrogen having a very low content (for example below 1 Vppm) of reducing components such as hydrogen and carbon monoxide is required. It is known, for example, in the preparation of such ultra high purity nitrogen, to remove impurities such as carbon monoxide and hydrogen from the intake air of an air fractionation plant by catalytic oxidation of carbon monoxide to carbon dioxide and/or hydrogen to water on catalyst beds using solid catalysts. The catalyst material can consist of hopcalite (mixture of oxides and/or peroxides of manganese, silver, cobalt and/or copper), or of a bed of aluminium oxide, in/on which palladium or platinum or else ruthenium, osmium, iridium or rhodium is incorporated or applied. The catalyst bed can be disposed directly downstream of the air compressor and can be operated at an elevated temperature of about 160° C. As an alternative thereto, it is possible to dispose the catalyst bed in the vessel in which the molecular sieve for drying the air is also situated.

Examples of the purification of feed air for an air fractionation plant for generating an ultra pure gas are found in EP-0 438 282-A1 and EP-0 454 531-A1. According to EP-0 438 282-A1, water is initially removed from the feed air stream by adsorption; thereafter, carbon monoxide and hydrogen are converted at ambient temperatures of 0 to 50° C. in one layer each of hopcalite and palladium-activated aluminium oxide and finally residual water, carbon dioxide and hydrocarbons are removed by adsorption. Using the known processes, typically, depletions of carbon monoxide and hydrogen by a factor of 20 are possible.

SUMMARY OF THE INVENTION

The object underlying the invention is to Specify a process and an apparatus of the type mentioned at the outset which effect a particularly high degree of depletion of carbon monoxide and/or hydrogen in the air stream.

This increase of the catalyst activity is effected in the context of the invention by means of the fact that dusts and/or aerosols of a particle size of less than 20 $\mu$m are removed from the air stream upstream of the catalytic oxidation.

Particle size is taken to mean here the particle diameter. In the case of particles whose shape deviate. from the spherical form, the hydraulic diameter is meant. The hydraulic diameter is defined as six times the ratio of volume to external surface area.

As does the older European Patent Application 0 799 633 which does not have an earlier priority date than the present application, the present invention begins from the finding that pollutant components which are present in the air stream decrease the activity of catalyst material. However, it has proven that only a restricted action can be achieved by the measures mentioner in EP 0 799 633 for removing pollutants in a gaseous state. In the context of the present invention it was fecund that the air contaminated with solid and liquid pollutants in the form of aerosols and dusts, in particular of laden dusts and pollutant-impregnated soot, plays an important role for the catalyst activity.

This is because harmful dusts and aerosols of a particle size of less than 20 $\mu$m flow through the customary mechanical filters and a molecular sieve bed essentially unhindered. They can thus deposit their pollutant load on the catalyst surface. A particularly harmful substance for the catalyst activity here is dust, which inter alia consists of soot (for example from combustion processes and/or diesel engines) which itself is enriched up to about 50% with acidic pollutants such as $SO_2$, $SO_3$, $H_2S$, COS, NO, $NO_2$ as well as Cl, HCl, F, HF and halogenated hydrocarbons and has a particle spectrum with a mean size around 1 $\mu$m. (These and all following percentages are by weight.)

According to the invention, such dusts and/or aerosols of a particle size of less than 20 $\mu$m, preferably less than 10 $\mu$m, are removed upstream of the catalytic oxidation by suitable measures. It is particularly important for increasing the catalyst activity to remove particles of a particle size of 0.05 to 5 $\mu$m, in particular in the range 0.1 to 3 $\mu$m. "Removal" is taken to mean here decreasing the content of the corresponding dusts and/or aerosols by at least 50%, in particular a decrease in the content of dusts and aerosols of a particle size between 0.1 and 3 $\mu$m by at least 50%, preferably by at least 80%.

In principle, all known methods for particle removal can be used. Preferably, dusts and/or aerosols of a particle size of less than 20 $\mu$m are removed by a scrubbing process. A scrubbing process in this case describes the direct contact of the air stream with a liquid; an example is countercurrent scrubbing. The scrubbing apparatus, depending on requirements, can be operated with an open or closed circulation of scrubbing medium, with or without sludge removal respectively.

Although a conventional trickling cooler, which is frequently used to precool feed air for a low-temperature air fractionation plant, can also be considered as a device for carrying out a scrubbing process, a cooler of this type in no way represents an apparatus for removing dusts and/or aerosols in the context of the invention. It is, for example, unable by far to decrease the content of particles of a size between 0.1 and 3 $\mu$m by at least 50%.

As scrubbing media, use can be made of water, in particular customary service water, or other suitable scrubbing liquids having suitable pHs.

Particular preference is given to the use of an overflow Venturi scrubber or of a jet scrubber or spray-zone scrubber. An overflow Venturi scrubber is able, for example, to separate off 50% or more of dusts having a particle size between 0.1 and 3 $\mu$m; depending on the setting of the pressure drop, degrees of separation of 90 to 97% or greater can be achieved. The degree of separation for aerosols is somewhat higher than that for dusts.

Alternatively, or additionally, for particle removal, an electrostatic precipitator or a mechanical particle separator, in particular a cyclone separator or a filter having a fine fibrous filter material, can be used. The last mentioned can consist, for example, of a fabric or felt material which is fabricated from long thin fibres. obviously, in the invention, a plurality of methods for particle removal can also be used in combination.

In addition to the removal according to the invention of dusts and/or aerosols of a particle size of less than 20 $\mu$m, it is expedient if particles of a particle size of at least 20 $\mu$m are removed from the air stream. This can be achieved using customary filter mats which are disposed, for example, upstream of a compressor for compressing the air stream.

The invention further relates to an apparatus for removing carbon monoxide and/or hydrogen from an air stream. In particular, there is provided an apparatus for removing carbon monoxide and/or hydrogen from an air stream having means for catalytic oxidation of carbon monoxide and/or hydrogen, characterized in that means for removing dusts and/or aerosols of a particle size of less than 20 µm are provided upstream of the means for catalytic oxidation. The means for removing dust and/or aerosols preferably comprises scrubbing apparatus such as an overflow Venturi scrubber, a jet scrubber, or a spray-zone scrubber.

BRIEF DESCRIPTION OF THE DRAWING

The invention and further details of the invention are described in more detail below with reference to an exemplary embodiment shown diagrammatically in the sole drawing FIGURE.

DETAILED DESCRIPTION OF THE DRAWING

An air stream a of 7000 m$^3$(S.T.P.) passes through a customary mechanical filter 1 and is there freed from particles of 20 µm or more in diameter. It is then compressed in a compressor 2 to 10 bar. The compressed air comprises 0.8 vppm hydrogen and 0.6 vppm carbon monoxide. In addition, it is loaded with solid pollutants, in particular with 1000 µg/m$^3$ (=8 g/h) of dust having a mean particle size of 2 µm. 60% thereof is soot which is laden with $SO_2$, Cl, F and $NO_x$ at an amount of in total 30% of the total dust mass. The air further comprises 4 g/h of gaseous pollutants, in particular $NO_2$ (0.1 vppm), $SO_2$ (0.1 vppm), $H_2S$ (0.05 vppm) and Cl (0.05 vppm).

After removing the heat of compression in a cooler 3 and subsequent separation of liquid water in a phase separation device 4, the air, below a temperature of 20° C., enters a device 5 for removing dusts and/or aerosols of a particle size of less than 20 µm which is designed as an overflow Venturi scrubber having a water recirculation rate of 2 m$^3$/h, a 400 mm dome cap and a water separator of diameter 400 mm. Water is introduced via line b into the overflow Venturi scrubber 5 and is taken off via line d together with the dusts and aerosols separated off together with the water produced in the phase separation device 4. In this scrubbing apparatus, the air stream suffers a pressure drop of about 500 mbar for a degree of dust separation of 99% and a degree of aerosol separation of a similar order of magnitude.

Downstream of the scrubber, the air freed from dust and aerosols enters a clean-up device 6 and passes through this from bottom to top. The clean-up device comprises two vessels which are operated alternately and in which the air stream passes successively through the following adsorptive or catalytically active layers:

Activated aluminium oxide molecular sieve 13X hopcalite (CO removal by catalytic oxidation) aluminium oxide containing 0.5% by weight Pd ($H_2$ removal by catalytic oxidation) molecular sieve 13X The vessels are switched over every 4 h between loading and regeneration. The vessel. which does not currently is receive the air stream is regenerated by 1500 to 2000 m$^3$/h of a regeneration gas g which comprises 31% oxygen and 69% nitrogen, is at a pressure of about 1 bar and has been heated in a heating device 7. After a heating time of 1.3 h (regeneration gas temperature: 130 to 180° C.), 2.3 h of cold flushing time follow (regeneration gas temperature: 23° C.).

After passing through the clean-up device, the air stream contains less than 1 vppb of hydrogen and less than 1 vppb of carbon monoxide. It is cooled by indirect heat exchange 8, for example by the regeneration gas g and/or other back streams, and fed via line f to a plant for producing high-purity nitrogen by low-temperature fractionation. The regeneration gas can be formed by a residual fraction of the low-temperature fractionation.

Exemplary of the particle size distribution of the solid pollutants is the following tabulation.

| >7 µm | 3–7 µm | 1–3 µm | 0.1–1 µm | <0.1 µm |
|---|---|---|---|---|
| 3% | 40% | 36% | 19% | 2% |

In general, the loading of the dust and/or aerosols is at least 50 µg/m$^3$, especially at least 300 µg/m$^3$, and more generally in the range of about 50 to 4,000 µg/m$^3$.

The preceding examples can be repeated with similar success by substituting the generically or specifically described reactants and/or operating conditions of this invention for those used in the preceding examples.

The entire disclosure of all applications, patents and publications, cited above, and of corresponding German application No. 197 43 733.8, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for removing carbon monoxide and/or hydrogen from an air stream in which the air stream is subjected to a catalytic oxidation, the improvement comprising removing dusts and/or aerosols of a particle size of less than 20 µm from the air stream upstream of the catalytic oxidation, and then subjecting the resultant catalytically oxidized gas to low temperature fractionation to produce high purity nitrogen.

2. A process according to claim 1, wherein the dusts and/or aerosols of a particle size of less than 20 µm are removed by a scrubbing process.

3. A process according to claim 2, wherein the water is used as scrubbing medium.

4. A process according to claim 2 wherein dusts and/or aerosols of a particle size of less than 20 µm are removed in an overflow Venturi scrubber or a jet scrubber or spray-zone scrubber.

5. A process according to claim 1, wherein dusts and/or aerosols of a particle size of less than 20 µm are removed by an electrostatic precipitator or by a mechanical particle separator .

6. A process according to claim 5, wherein the air stream is passed through a cyclone separator or a filter of fine fibrous materials capable of retaining said dust and/or aerosols having a particle size of less than 20 µm.

7. A process according to claim 1, further comprising removing particles of a particle size of at least 20 µm from the air stream upstream of the removal of dusts and/or aerosols of a particle size of less than 20 µm.

8. A process according to claim 1, wherein said particle size is 0.05 to 5 µm.

9. A process according to claim 8, wherein at least 80% of the dusts and/or aerosols are removed.

10. A process according to claim 1, wherein said particle size is 0.1 to 3 μm.

11. A process according to claim 10, wherein at least 80% of the dusts and/or aerosols are removed.

12. A process according to claim 1, wherein at least 80% of the dusts and/or aerosols are removed.

13. An apparatus comprising a low temperature fractionation plant for producing nitrogen from air, and apparatus for removing carbon monoxide and/or hydrogen from an air stream comprising means for catalytic oxidation of carbon monoxide and/or hydrogen, means for removing dusts and/or aerosols of a particle size of less than 20 μm in upstream communication with the means for catalytic oxidation, and a conduit for passing resultant catalytically oxidized air to said low temperature fractionation plant.

14. An apparatus according to claim 13, wherein that the means for removing dusts and/or aerosols of a particle size of less than 20 μm comprises scrubbing apparatus.

15. An apparatus according to claim 14, wherein the scrubbing apparatus is an overflow Venturi scrubber or a jet scrubber or a spray-zone scrubber.

16. An apparatus according to claim 15, wherein the means for removing dusts and/or aerosols of a particle size of less than 20 μm comprises an electrostatic precipitator or a mechanical particle separator.

17. An apparatus according to claim 13, wherein said means for removing comprises a cyclone separator or a filter of fine fibrous materials capable of retaining said dust and/or aerosols having a particle size of less than 20 μm.

* * * * *